Figure 1:
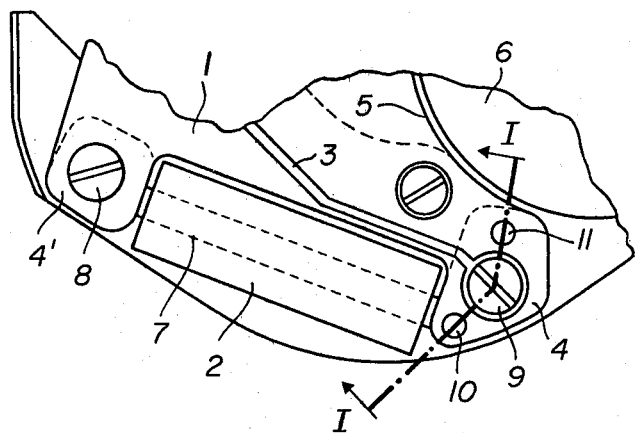

United States Patent [19]

Huot-Marchand et al.

[11] 4,317,187
[45] Feb. 23, 1982

[54] SYSTEM FOR MOUNTING THE COIL OF THE MOTOR IN AN ELECTRIC WATCH

[75] Inventors: Daniel Huot-Marchand, Montferrand le Chateau; Fernand Zangiacomi, Besancon, both of France

[73] Assignee: France Ebauches S.A., France

[21] Appl. No.: 128,391

[22] Filed: Mar. 10, 1980

[30] Foreign Application Priority Data

Mar. 9, 1979 [FR] France ................ 79 06309

[51] Int. Cl.³ .............................................. G04C 23/02
[52] U.S. Cl. ....................... 368/88; 368/155; 368/156
[58] Field of Search ........... 310/40 MM; 29/739, 832, 29/602 R; 361/400; 336/233; 335/281, 297; 368/155, 156, 88, 204

[56] References Cited

U.S. PATENT DOCUMENTS

| | | | |
|---|---|---|---|
| 3,898,789 | 8/1975 | Arzt | 368/155 |
| 3,943,695 | 3/1976 | Bauer et al. | 368/204 X |
| 4,186,551 | 2/1980 | Nakayama | 368/88 |

FOREIGN PATENT DOCUMENTS

| | | |
|---|---|---|
| 704924 | 5/1931 | France . |
| 2218588 | 5/1931 | France . |
| 2371791 | 6/1978 | France . |
| 194506 | 3/1938 | Switzerland . |
| 237640 | 7/1945 | Switzerland . |

Primary Examiner—Ulysses Weldon
Attorney, Agent, or Firm—Ostrolenk, Faber, Gerb & Soffen

[57] ABSTRACT

A system for fastening the coil of a step-by-step motor in an electric or an electronic watch.

It is characterized by the fact that one or both pole pieces 4 and 4' of the coil 2 have extrusions 10 and 11 of cylindrical shape which extend perpendicular to the plane of the pole piece 4 and are intended to be introduced into corresponding boreholes in the substrate of the printed circuit 1.

This arrangement is advantageous since the extrusions can be produced by stamping before the heat treatment of the pole pieces, which eliminates the stresses which might, upon the mounting of the coil, destroy the magnetic qualities of the materials.

7 Claims, 3 Drawing Figures

SYSTEM FOR MOUNTING THE COIL OF THE MOTOR IN AN ELECTRIC WATCH

The present invention relates to a system for fastening the coil of a step-by-step motor in an electric or electronic watch.

Ordinarily, the core of the coil is extended at its two ends by two flanges which make it possible to mount it on the substrate of the printed circuit and then make it integral with the stator of the motor and fasten the assembly, mounted in this manner, on the plate of the watch. The precise positioning of the coil with respect to the substrate of the printed circuit is effected by driving metallic studs through holes provided in the pole pieces of the coil and into corresponding boreholes provided in the substrate of the printed circuit. This operation is effected after the heat treatment of the said pole pieces and may physically damage certain extremely fragile parts or produce stresses capable of destroying the magnetic properties of the materials. This is all the more serious since these risks are present at the time of assembly after all the parts have been individually manufactured and have all undergone a heat treatment.

The present invention proposes to overcome said drawbacks by providing a simple and economic system which makes it possible to mount the coil of the motor without danger on the substrate of the printed circuit.

For this purpose, the present invention is characterized by the fact that at least one of the pole pieces of the coil has at least one extrusion which protrudes from the plane of said piece and is of a shape and dimensions which are complementary with respect to those of a corresponding recess in a support on which the coil is intended to be mounted.

In accordance with one preferred embodiment, one or two extrusions of cylindrical shape are produced by stamping in one of the pole pieces. Their dimensions correspond to the dimensions of two boreholes provided in the substrate of the printed circuit and into which the said extrusions can be forced by a slight pressure.

Figure 2:
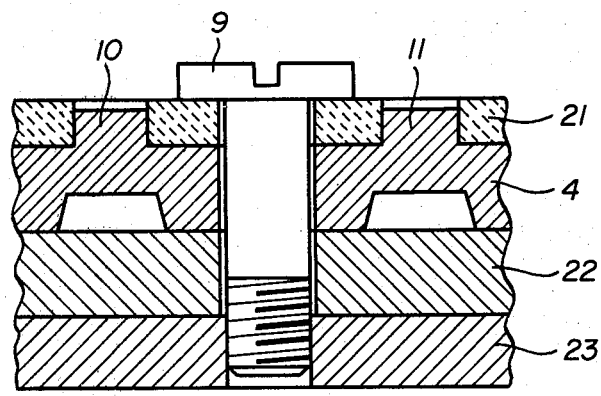
Figure 3:
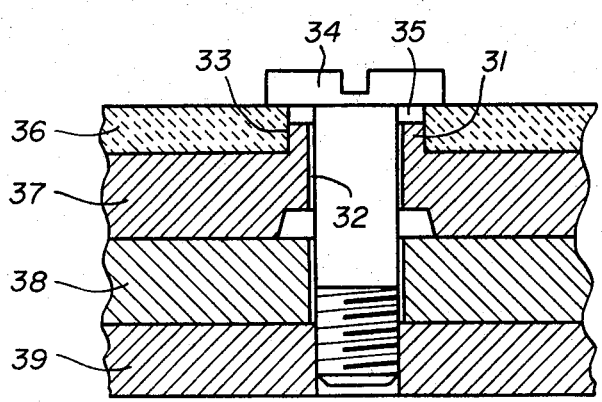

The present invention and its variants will be better understood by reference to the description of illustrative embodiments and the accompanying drawings, in which:

FIG. 1 is a partial top view of an electronic watch, showing in particular the coil and its pole pieces, FIG. 2 is a cross section along the broken line I—I of FIG. 1, and FIG. 3 is a variant of the sectional view of FIG. 2 in which the extrusion comprises a central axial borehole.

Referring to the figures, the electronic watch, which is partially shown, comprises an electronic module formed of a printed circuit 1 and a quartz resonator, a frequency corrector, an integrated circuit (not shown) and a coil 2, the assembly consisting of these elements being mounted on the printed circuit 1. The printed circuit 1 has a substrate 21 and a plurality of conductive paths such as the path 3 which leads to one of the pole pieces 4 of the coil 2. Its shape is cut out at 5 in such a manner as to permit the placing of an electric battery in the suitable housing 6.

The coil 2 comprises a core 7 which is extended at each of its ends by two pole pieces 4 and 4', each of which has a circular opening for the passage of fastening screws 8 and 9, provided in order to secure the electronic module to the plate 23. In the embodiment shown in FIGS. 1 and 2, the pole piece 4 has two cylindrical extrusions 10 and 11 which are produced by stamping at the time of their manufacture, prior to their heat treatment. These two extrusions 10 and 11 constitute two studs adapted to fit into two corresponding boreholes of the substrate 21. These extrusions have the advantage that they can be manufactured in simple fashion by a stamping process before the heat treatment of the pole pieces and that they are dimensioned in such a manner that they can be introduced by a slight pressure into the corresponding boreholes of the substrate of the printed circuit.

As shown more particularly in FIG. 2, the pole pieces 4 and 4' are mounted on the substrate 21 by means of the extrusions 10 and 11, whereupon this assembly is fastened on the stator 22 of the motor, the entire unit being attached to the plate 23 by means of the fastening screw 9.

Referring to FIG. 3, the extrusions 10 and 11 of FIG. 2 are replaced by a single extrusion 31 having a central cylindrical bore 32 which is concentric to the outer peripheral surface 33 of the said extrusion 31. The cylindrical bore 32 is dimensioned to permit the passage of a fastening screw 34 which plays the same role as the fastening screw 9 in FIG. 2. As previously, the extrusion 31 is introduced into a cylindrical bore 35 provided in the substrate 36 of the printed circuit. The coil, extended by the pole piece 37, is first of all made fast to the substrate 36 by means of the extrusion 31, this assembly being then associated with the stator 38 of the motor and fastened to the plate 39 by means of the fastening screw 34.

Of course, the present invention is not limited to the arrangements described. It may be supplemented by many variants which will be evident to the man skilled in the art, such as the use of one or more extrusions on one or the other or both pole pieces of the coil.

We claim:

1. A system for mounting the coil of the motor in an electric watch wherein the electric watch includes an electric motor for driving the watch, the motor includes a coil on a core and the core has pole pieces, a support for the coil, the support having a respective recess defined therein for a respective extrusion of a pole piece, at least one of the pole pieces of the coil has at least one extrusion which protrudes with respect to the plane of said piece, and the extrusion is of a shape and of dimensions complementary with respect to those of the respective corresponding recess in the support on which the coil is intended to be mounted and the respective recess being placed such that the extrusion can be received in that recess.

2. A system according to claim 1, wherein the pole piece of the coil core comprise two flat flanges, each of which forms an extension on a respective end of the core of the coil, at least one of these flanges having the at least one extrusion thereon, and the flange extrusion being produced by stamping prior to the heat treatment of the pole piece, the extrusion being cylindrical in shape and the extrusion extending perpendicular to the plane of the flange.

3. A system according to either of claims 1 or 2, wherein the watch includes a printed electric circuit connected to the motor, the support on which the coil is intended to be mounted comprises a substrate for the printed circuit of the watch, the recess in the support comprising the substrate having at least one cylindrical bore therein having a diameter that corresponds to that of the extrusion of the pole piece, so that the extrusion can be force-fitted in the substrate bore by a slight pressure.

4. A system according to claim 3, wherein the cylindrical extrusion has an axial cylindrical bore therethrough concentric with respect to the peripheral surface of the extrusion and intended for the passage of a fastening screw, and a fastening screw passing through the cylindrical bore for fastening the printed circuit, pole piece and substrate.

5. A system according to either of claims 1 or 2, wherein at least one pole piece has a pair of the extrusions thereon and the support has a respective recess defined therein for each of the extrusions of the pair thereof, and each of the recesses in the support being placed such that one of the extrusions can be received in that recess.

6. A system according to claim 5, further comprising a bore extending through the pole piece and spaced from both of the extrusions and intended for the passage therethrough of a fastening element, and a fastening element passing through the bore for fastening the pole piece and the support.

7. A system according to claim 1, wherein the pole piece has a bore therethrough intended for the passage of a fastening element, and a fastening element passing through the bore for fastening the pole piece and the support.

* * * * *